(12) United States Patent
Versari

(10) Patent No.: US 12,162,608 B2
(45) Date of Patent: Dec. 10, 2024

(54) ROTARY WING AIRCRAFT

(71) Applicant: SOCIETA' PER AZIONI CURTI-COSTRUZIONI MECCANICHE, Castel Bolognese (IT)

(72) Inventor: Stefano Versari, Castel Bolognese (IT)

(73) Assignee: SOCIETA' PER AZIONI CURTI-COSTRUZIONI MECCANICHE (IT)

( * ) Notice: Subject to any disclaimer, the term of this patent is extended or adjusted under 35 U.S.C. 154(b) by 82 days.

(21) Appl. No.: 18/129,515

(22) Filed: Mar. 31, 2023

(65) Prior Publication Data

US 2023/0322356 A1   Oct. 12, 2023

(30) Foreign Application Priority Data

Apr. 7, 2022   (IT) .......... 102022000006902

(51) Int. Cl.
| | |
|---|---|
| *B64D 17/80* | (2006.01) |
| *B64C 11/00* | (2006.01) |
| *B64C 27/00* | (2006.01) |
| *B64C 27/06* | (2006.01) |
| *B64C 27/16* | (2006.01) |
| *B64D 17/02* | (2006.01) |
| *B64D 17/62* | (2006.01) |

(52) U.S. Cl.
CPC ............ *B64D 17/80* (2013.01); *B64C 11/002* (2013.01); *B64C 27/006* (2013.01); *B64C 27/06* (2013.01); *B64C 27/16* (2013.01); *B64D 17/02* (2013.01); *B64D 17/62* (2013.01)

(58) Field of Classification Search
CPC ...... B64C 27/006; B64D 17/80; B64D 17/62; B64U 70/83
See application file for complete search history.

(56) References Cited

FOREIGN PATENT DOCUMENTS

| DE | 3617294 A1 | 11/1987 |
|---|---|---|
| EP | 1160159 A1 | 12/2001 |
| FR | 2772340 A1 | 6/1999 |

*Primary Examiner* — Nicholas McFall
*Assistant Examiner* — Terri L Filosi
(74) *Attorney, Agent, or Firm* — The Belles Group, P.C.

(57) ABSTRACT

A rotary wing aircraft has a nacelle, at least one rotor provided with at least one blade, a braking device to stop the rotation of the rotor, an emergency parachute provided with a canopy and with a rope, a rocket to start the extraction of the canopy from the nacelle, two operating devices to operate the braking device and the rocket, respectively, and a single actuator device to operate both the operating devices.

17 Claims, 6 Drawing Sheets

ROTARY WING AIRCRAFT

CROSS-REFERENCE TO RELATED APPLICATIONS

This patent application claims priority from Italian patent application no. 102022000006902 filed on Apr. 7, 2022 the entire disclosure of which is incorporated herein by reference.

TECHNICAL FIELD

The present invention relates to a rotary wing aircraft. In particular, the present invention relates to a rotary wing aircraft of the type comprising a nacelle; a rotor mast mounted so as to rotate around a rotation axis and provided with at least one blade; and a first operating device to impart to the rotor mast a rotation movement around the rotation axis.

BACKGROUND

The first operating device normally comprises a turbine motor provided with an output shaft, and a transmission shaft coupled to the output shaft through the interposition of a freewheel and further coupled to the rotor mast through the interposition of a bevel gear unit.

The rotary wing aircraft also has a pocket obtained in the nacelle and closed by a door; an emergency parachute comprising a canopy housed inside the pocket, and a rope, which is housed partly inside the pocket, extends partly outside the pocket and has an end loop fitted around the rotor mast; and a rocket mounted in the pocket to start expulsion of the door from the nacelle and of the canopy from the pocket.

The rotary wing aircraft further comprises a braking device to stop the rotation of the transmission shaft; a second operating device to operate the braking device; and a third operating device to operate the rocket.

As the second operating device and the third operating device are activated by respective actuator devices, rotary wing aircraft of the type described above have some drawbacks, mainly deriving from the fact that the installation of two actuator devices inside the cockpit is relatively difficult due to the relatively small spaces of the cockpit, has relatively limited ergonomics and is relatively complex and costly.

Moreover, rotary wing aircraft of the type described above have the further drawback consisting of the fact that operation of the two actuator devices in succession causes a relatively lengthy operating cycle and, therefore, delayed opening of the canopy and can compromise execution of the correct operating sequence of the braking device and of the rocket.

SUMMARY

The object of the present invention is to provide a rotary wing aircraft without the drawbacks set forth above and which is simple and economical to manufacture.

According to the present invention, a rotary wing aircraft as claimed in the appended claims is provided.

BRIEF DESCRIPTION OF THE DRAWINGS

The present invention will now be described with reference to the accompanying drawings, which illustrate a non-limiting embodiment thereof, wherein.

DESCRIPTION OF EMBODIMENTS

Figure 1:
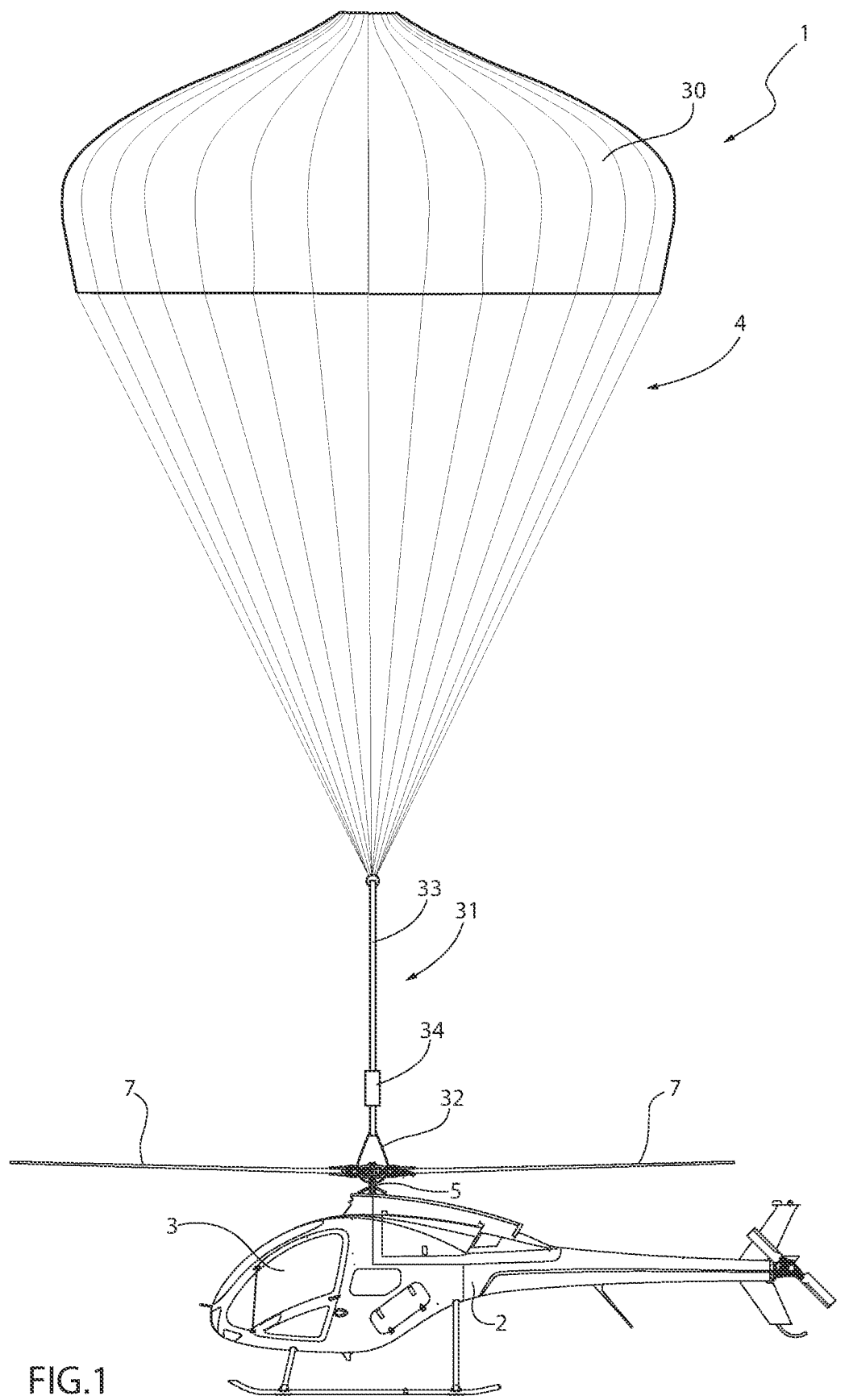
FIG. 1 is a schematic side view, with parts removed for clarity, of a preferred embodiment of the rotary wing aircraft of the present invention.
Figure 2:
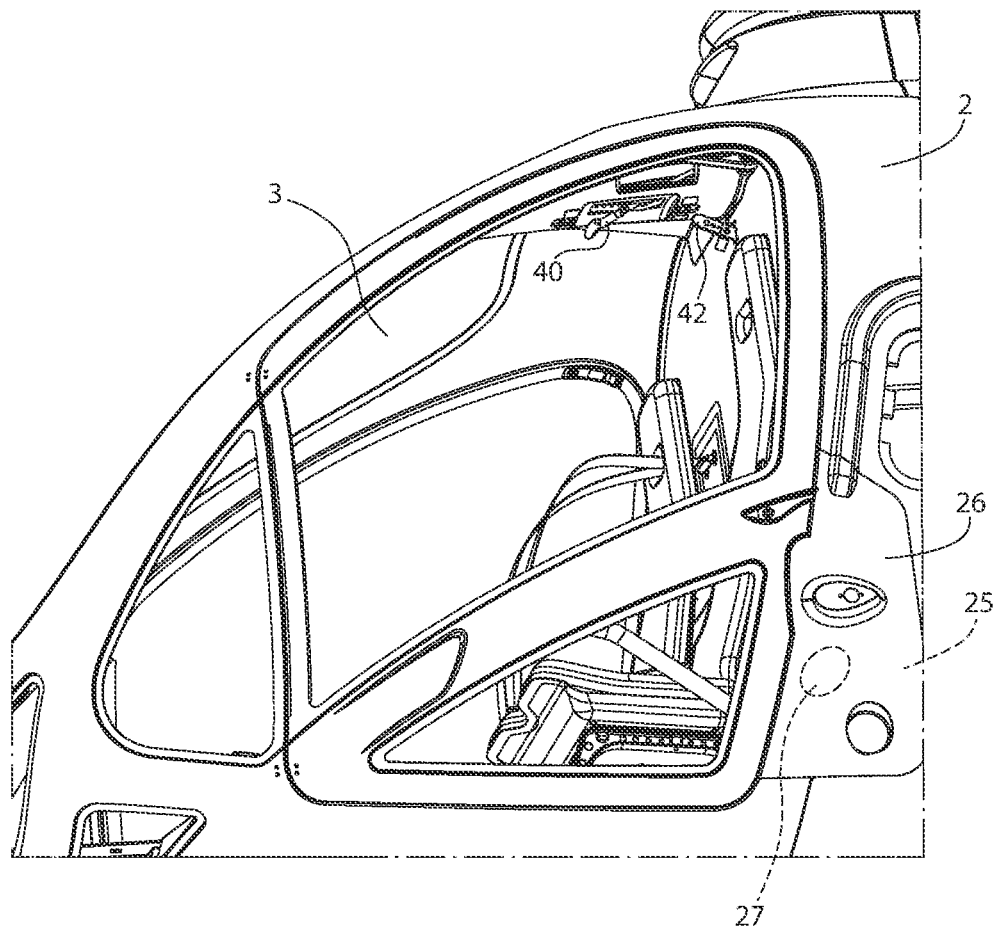
FIG. 2 is a schematic perspective view, with parts removed for clarity, of a first detail of the rotary wing aircraft of FIG. 1.
Figure 3:
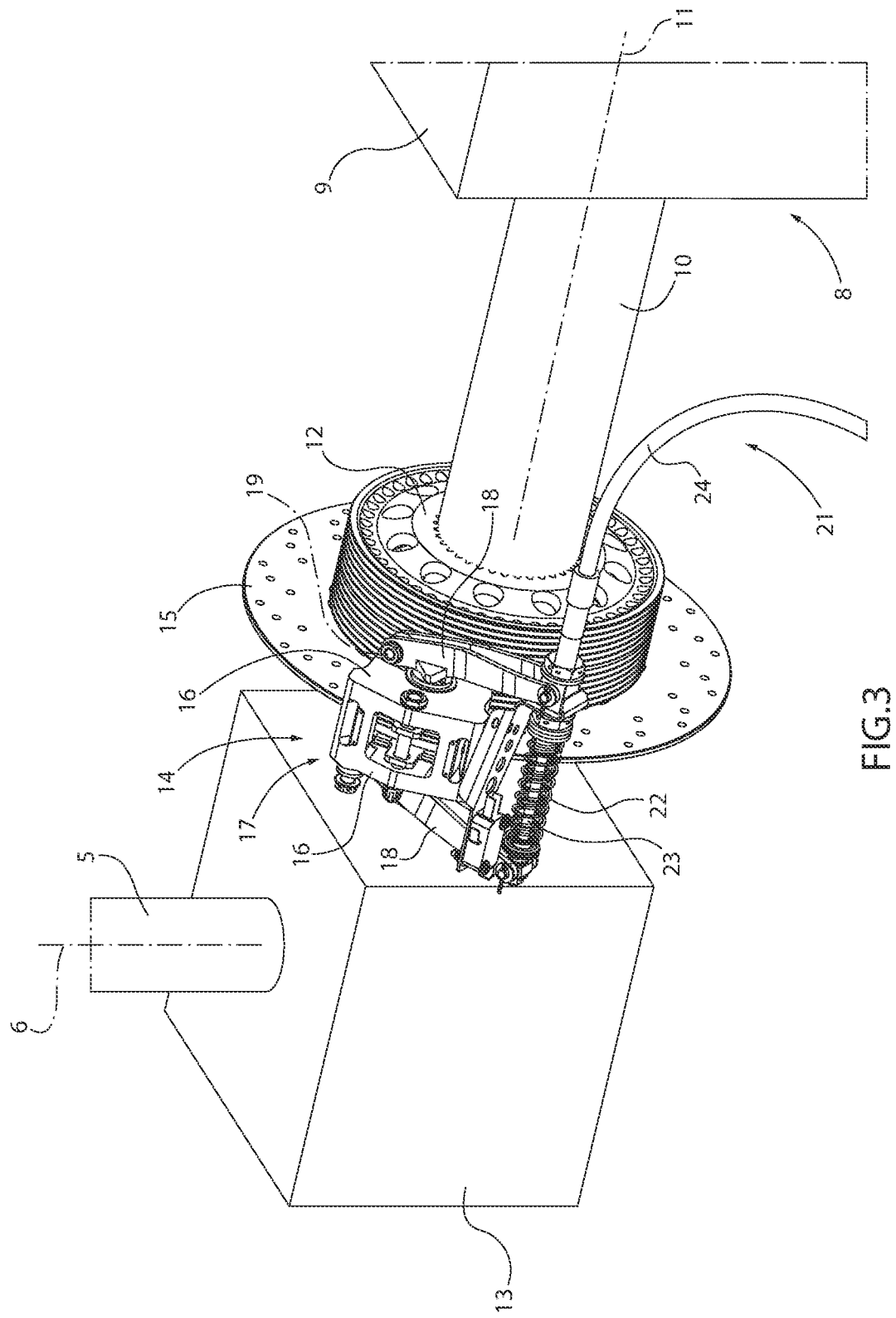
FIG. 3 is a schematic perspective view, with parts removed for clarity, of a second detail of the rotary wing aircraft of FIG. 1.

With reference to FIGS. 1, 2, and 3, number 1 indicates, as a whole, a rotary wing aircraft, in this case a helicopter comprising a nacelle 2 defining a cockpit 3 for at least one passenger, and an emergency parachute 4 to prevent the helicopter from crashing and to allow the helicopter 1 to land at a controlled speed.

The helicopter 1 further comprises at least one rotor mast 5 of known type, which is mounted so as to rotate around a rotation axis 6, and is provided with at least one blade 7 coupled in a known way to the rotor mast 5.

The rotor mast 5 is rotated around the axis 6 by an operating device 8 comprising, in this case, a turbine motor 9 provided with an output shaft 10 mounted so as to rotate around a rotation axis 11 substantially transverse to the axis 6.

The device 8 is further provided with a transmission shaft 12, which is mounted so as to rotate around the axis 11, is coupled to the shaft 10 through the interposition of a freewheel, known and not shown, and is further coupled to the rotor mast 5 through the interposition of a bevel gear unit 13.

The helicopter 1 is further provided with a braking device 14 comprising a braking disc 15, which is mounted on the shaft 12 coaxially to the axis 11, and is interposed between two plates 16 of a support frame 17 of the device 14.

Figure 7:
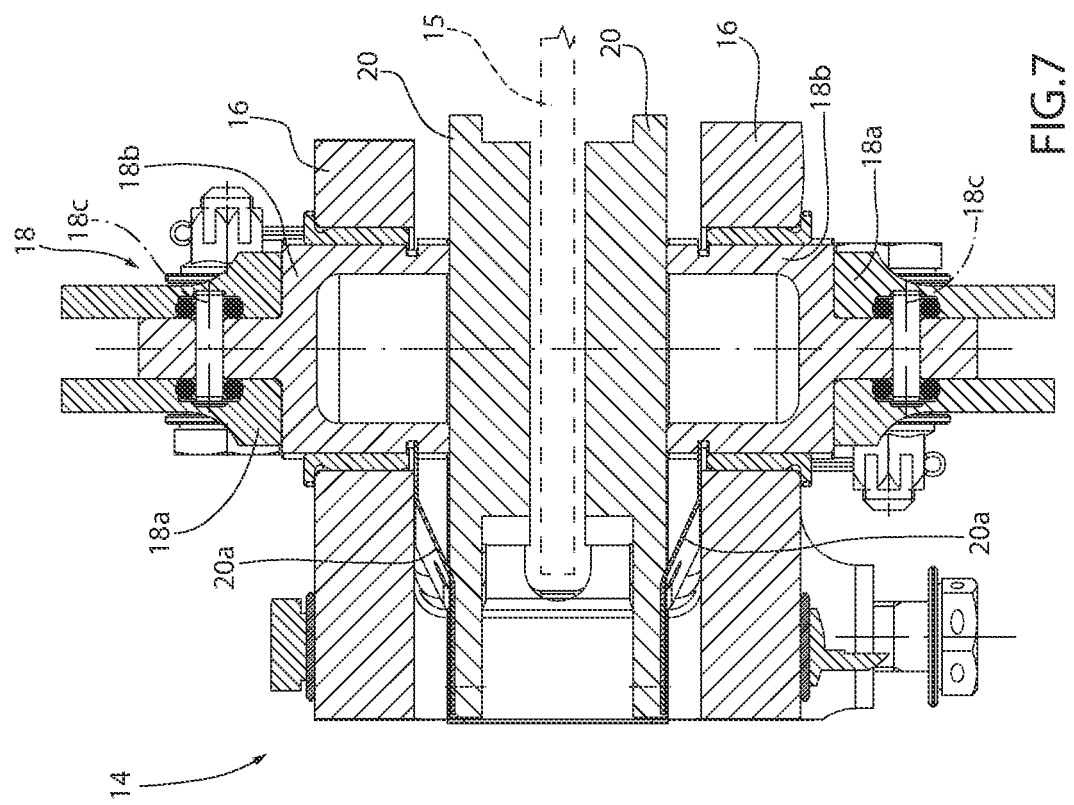
FIG. 7 is a schematic sectional view, with parts removed for clarity, of a detail of FIG. 3.

The device 14 further comprises two jaws 18, each of which comprises a crank 18a hinged to a corresponding plate 16 to rotate, relative to the corresponding plate 16, around a pivot axis 19 transverse to the axis 11, and also has a cylindrical piston 18b, which is hinged to the crank 18a to rotate, relative to the crank 18a, around a pivot axis 18c parallel to the axis 19, and is mounted in contact with a braking pad 20 (FIG. 7).

Figure 8:
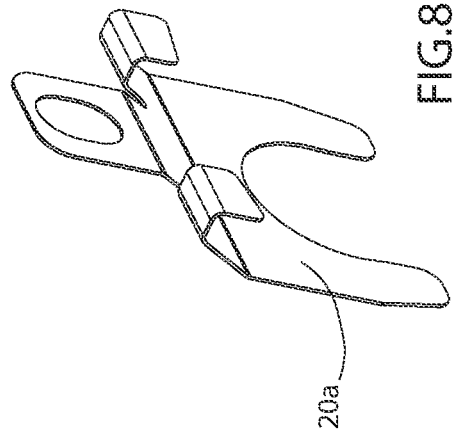
FIG. 8 is a schematic perspective view of a detail of FIG. 7.

The pad 20 is coupled to a corresponding plate 16 in a sliding manner, and is maintained in contact with the corresponding jaw 18 through a leaf spring 20a interposed between the piston 18b and the pad 20 (FIGS. 7 and 8).

The jaws 18 and the pads 20 are moved between a clamping position and a release position of the disc 15 by an operating device 21 comprising a spring 22 interposed between the jaws 18 to move, and normally hold, the jaws 18 and the pads 20 in the release position, and a traction cable 23, which is fixed to one of the jaws 18, is housed inside a sheath 24 fixed to the other jaw 18, and is suitable to move the jaws 18 and the pads 20 from the release position to the clamping position against the action of the spring 22.

The nacelle 2 is provided with a side pocket 25, which is obtained in a rear area of the cockpit 3, is closed by a door 26 anchored to the nacelle 2, and houses, on the inside, a rocket 27 suitable to start expulsion of the door 26 from the nacelle 2.

According to FIG. 4, the rocket 27 is operated, according to methods that will be better illustrated below, by an operating device 28 comprising a traction cable 29 suitable to start the explosive charge of the rocket 27.

With reference to FIG. 1, the parachute 4 comprises a canopy 30 and a rope 31 having an end loop 32 fitted around the rotor mast 5 so as to rotate around the axis 6 and an intermediate section 33, which extends between the canopy 30 and the loop 32, and is coupled to the loop 32 through the interposition of a coupling joint 34 configured to prevent the section 33 and, therefore, the canopy 30 from rotating around the axis 6 under the thrust of the rotor mast 5.

In an initial configuration of the parachute 4 (FIG. 2), the canopy 30 is folded and housed inside the pocket 25 and the rope 31 extends partly inside the pocket 25 and partly outside the pocket 25.

In a final configuration of the parachute 4 (FIG. 1), the rope 31 extends entirely outside the pocket 25 and the canopy 30 is open outside the pocket 25.

Figure 4:
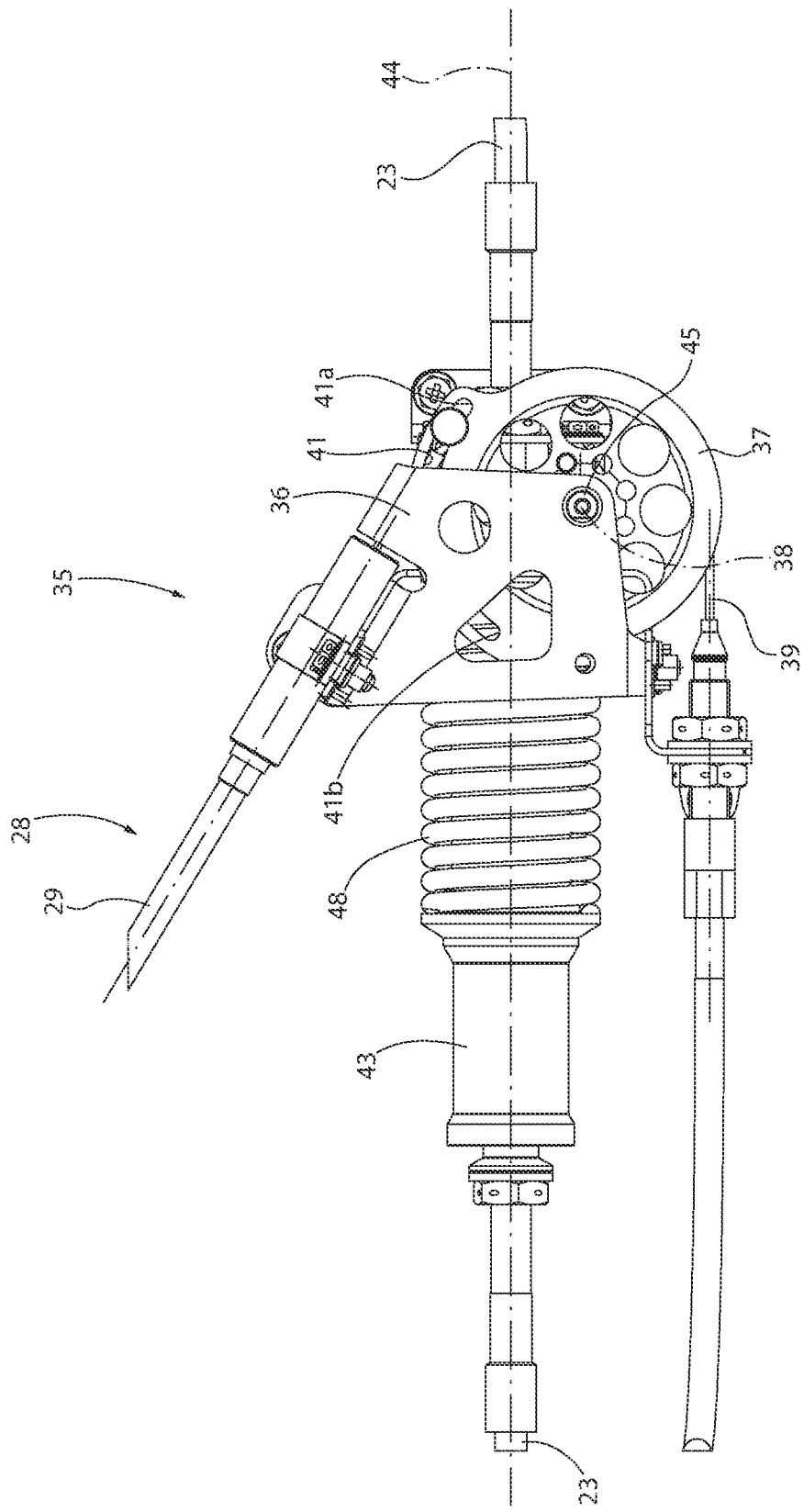
FIG. 4 is a schematic plan view, with parts removed for clarity, of a third detail of the rotary wing aircraft of FIG. 1.
Figure 5:
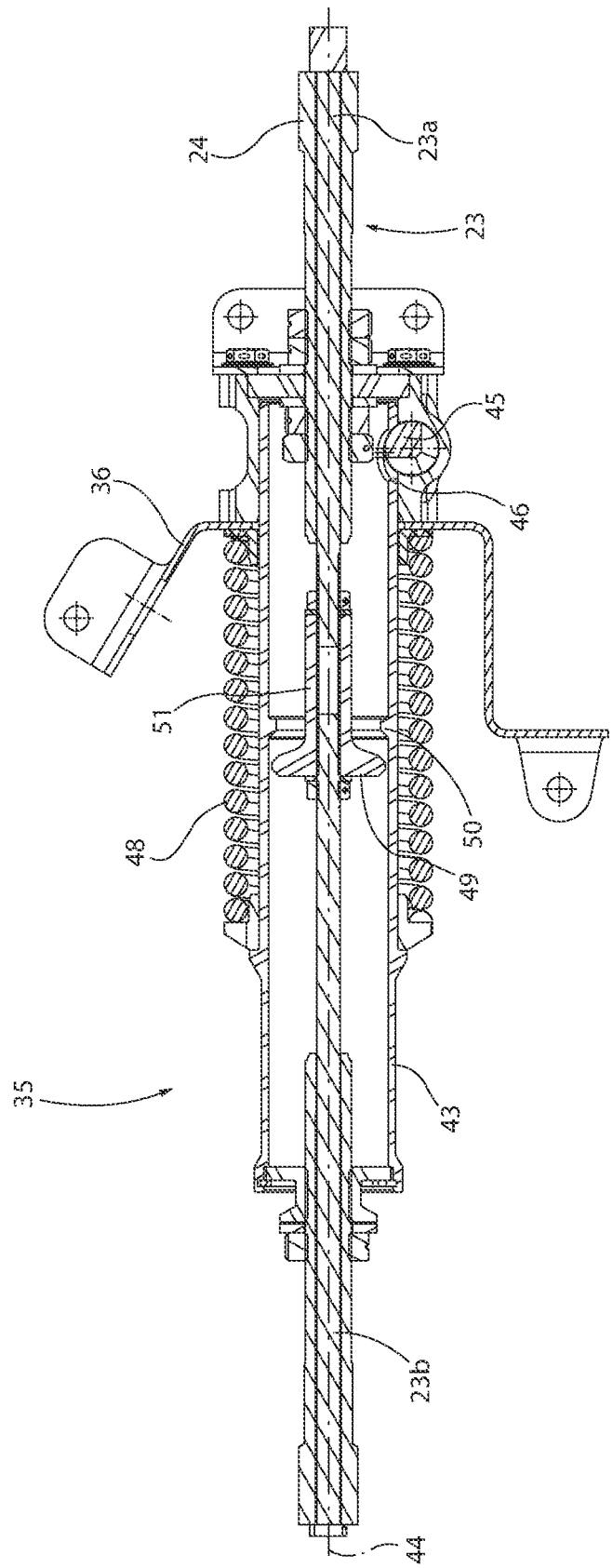
FIG. 5 is a schematic sectional view, with parts removed for clarity, of a first detail of FIG. 4.
Figure 6:
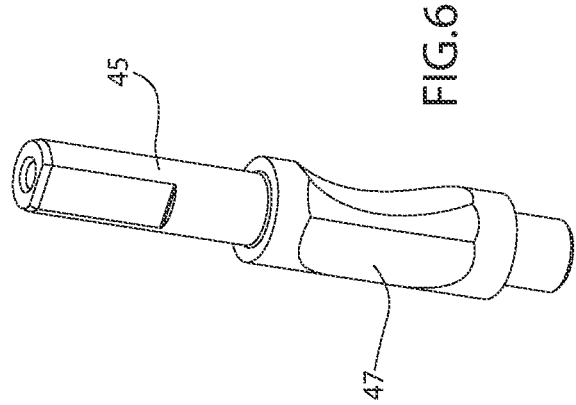
FIG. 6 is a schematic perspective view of a second detail of FIG. 4.

According to FIGS. 4, 5, and 6, the helicopter 1 further comprises a single actuator device 35 configured to activate both the traction cable 23 and, therefore, the operating device 21 of the braking device 14, and the traction cable 29 and, therefore, the operating device 28 of the rocket 27.

The device 35 comprises a support frame 36, a pulley 37 coupled to the frame 36 so as to rotate, relative to the frame 36, around a rotation axis 38, and a traction cable 39, which is wound around the pulley 37, is connected to an operating lever 40 housed inside the cockpit 3 (FIG. 2), and is suitable to move the pulley 37 around the axis 38 between an initial position and a final position.

The pulley 37 has a slot 41, which is obtained along a perimeter edge of the pulley 37, extends around the axis 38, and houses inside it a free end of the cable 29.

The free end of the cable 29 is engaged in the slot 41 in a sliding manner, and is arranged at a first end 41a of the slot 41 when the pulley 37 is arranged in its initial position.

The cable 23 has a free end coupled to an operating lever 42 housed inside the cockpit 3 (FIG. 2), extends inside a cylindrical sleeve 43 having a longitudinal axis 44 transverse to the axis 38, and is coupled to the sleeve 43 in a sliding manner.

The sleeve 43 is coupled to the frame 36 in a sliding manner, and is locked in a rest position by the engagement of a coupling pin 45 in a corresponding recess 46 obtained on the outer surface of the sleeve 43 parallel to the axis 38.

The pin 45 extends through the pulley 37 coaxially to the axis 38, is coupled to the pulley 37 in an axially and angularly fixed manner, and is delimited by a shaped outer surface 47.

Following rotation of the pulley 37 and of the pin 45 around the axis 38, the surface 47 disengages the recess 46, and allows a spring 48 interposed between the frame 36 and the sleeve 43 to move the sleeve 43 from its rest position to an operating position and the sleeve 43 to draw the cable 23 through the engagement of two annular flanges 49, 50 obtained on the outer surface of a sleeve 51 and on the inner surface of the sleeve 43, respectively.

The sleeve 51 is mounted inside the sleeve 43 coaxially to the axis 44 so as to connect two portions 23a and 23b of the cable 23 to each other.

Operation of the helicopter 1 will now be described starting from an instant in which the pulley 37 is arranged in its initial position and the sleeve 43 is arranged in its rest position.

In emergency conditions and to prevent the helicopter 1 from crashing to the ground, the passenger inside the cockpit 3 operates the lever 40 and, therefore, the cable 39 so as to: rotate the pulley 37, the slot 41, and the pin 45 around the axis 38; disengage the pin 45 from the recess 46 and allow the spring 48 to move the sleeve 43 from its rest position to its operating position, the flange 50 of the sleeve 43 to draw the flange 49 of the sleeve 51 and the cable 23, and the cable 23 to operate, therefore, the braking device 14; and allow a second end 41b of the slot 41 opposite the end 41a to come into contact with the free end of the cable 29, operate the rocket 27, and start expulsion of the door 26 from the nacelle 2 and of the parachute 4 from the pocket 25.

Therefore, in this case, the slot 41 has a tangential length such as to allow the lever 40 to operate at first, the braking device 14 and, subsequently, the rocket 27.

According to some variants, not shown, the slot 41 is shaped so as to allow the lever 40 to operate, at first, the rocket 27 and, subsequently, the braking device 14, or the braking device 14 and the rocket 27 simultaneously.

In non-emergency conditions, operation of the lever 42 allows movement of the cable 23 relative to the sleeve 43 and operation of the braking device 14 independently from operation of the rocket 27.

With regard to the above, is should be specified that: in emergency conditions, the actuator device 35 allows operation of both the braking device 14 and the rocket 27 in a manner that is relatively quick, simple, economical and ergonomic and with the correct time sequence of activation of the device 14 and of the rocket 27; and in non-emergency conditions, the lever 42 allows operation of the braking device 14 alone.

According to some variants, not shown: the door 26 is eliminated and the pocket 25 is open towards the outside environment; the pocket 25 is eliminated and the rocket 27 and the canopy 30 are coupled to the nacelle 2; the cockpit 3 is eliminated, the nacelle 2 is configured for the transportation of goods, and the helicopter 1 is controlled remotely; and the operating device 21, the operating device 28, and the actuator device 35 are used in different rotary wing aircrafts to the helicopter 1, such as a gyrocopter or a multirotor aircraft and both in rotary wing aircrafts piloted by a crew and in rotary wing aircrafts piloted remotely, regardless of the propulsion system.

The invention claimed is:

1. A rotary wing aircraft comprising:
   a nacelle;
   at least one rotor mast mounted so as to rotate around a first rotation axis and provided with at least one blade;
   a first operating device to move the rotor mast around the first rotation axis;
   a braking device to stop the rotation of the rotor mast;
   an emergency parachute mounted on the nacelle and comprising a canopy and a rope provided with an end loop fitted around the rotor mast;
   a rocket to start the extraction of the canopy from the nacelle;
   a second operating device to operate the braking device;
   a third operating device to operate the rocket; and one single actuator device to operate both the second operating device and the third operating device.

2. The rotary wing aircraft according to claim 1 and further comprising a further actuator device to operate the second operating device only.

3. The rotary wing aircraft according to claim 1, wherein the braking device comprises a braking disc, which is angularly integral to the rotor mast or to a transmission shaft of the first operating device, and a pair of jaws, which are mounted on opposite sides of the braking disc and are movable between a clamping position and a release position to clamp and release the braking disc; the second operating device comprising a first traction cable connected to the jaws in order to move the jaws to the clamping position.

4. The rotary wing aircraft according to claim 3, wherein the second operating device further comprises first elastic pushing means to move the jaws from the clamping position to the release position.

5. The rotary wing aircraft according to claim 3, wherein the braking device further comprises a pair of braking pads, which are interposed between the braking disc and the jaws and are movable to the clamping position due to the thrust of the jaws; and, for each braking pad, respective second elastic pushing means designed to move the braking pad from the clamping position to the release position.

6. The rotary wing aircraft according to claim 3, wherein the actuator device further comprises a support frame, a pulley, which is mounted so as to rotate, relative to the support frame, around a second rotation axis, and a third traction cable, which is wound around the pulley; said first and second traction cables being connected to the pulley so that the activation of the third traction cable causes the rotation of the pulley around the second rotation axis and the activation of said first and second traction cables.

7. The rotary wing aircraft according to claim 6, wherein the second operating device comprises a sleeve, which has a longitudinal axis transverse to the second rotation axis and is coupled to the support frame in a sliding manner so as to move, relative to the pulley, parallel to the longitudinal axis; the first traction cable extending through the sleeve.

8. The rotary wing aircraft according to claim 7, wherein the actuator device further comprises a coupling element, which is movable between a locking position, in which it locks the sleeve in a rest position, and a release position, in which the coupling element disengages the sleeve in order to allow the sleeve to move parallel to its longitudinal axis from the rest position to an operating position for the activation of the first traction cable.

9. The rotary wing aircraft according to claim 8, wherein the second operating device further comprises third elastic pushing means mounted between the support frame and the sleeve so as to move the sleeve from its rest position to its operating position, when the coupling element is arranged in its release position.

10. The rotary wing aircraft according to claim 8, wherein the first traction cable is coupled to the sleeve in a sliding manner and is axially locked on the sleeve during the movement of the sleeve from its rest position to its operating position through the engagement of two coupling flanges obtained on the first traction cable and on the sleeve, respectively.

11. The rotary wing aircraft according to claim 10 and further comprising a further actuator device to move the first traction cable relative to the sleeve.

12. The rotary wing aircraft according to claim 11, wherein the further actuator device comprises a first operating lever mounted inside the cockpit and connected to the first traction cable.

13. The rotary wing aircraft according to claim 8, wherein the coupling element comprises a coupling pin, which is mounted through the pulley coaxially to the second rotation axis, is coupled to the pulley in an angularly fixed manner, is delimited by a shaped side surface and is movable around the second rotation axis between the locking position, in which the shaped side surface engages a recess obtained on the sleeve in order to lock the sleeve in its rest position, and the release position, in which the shaped side surface disengages the recess in order to allow the sleeve to move from its rest position to its operating position.

14. The rotary wing aircraft according to claim 6, wherein the actuator device further comprises a second operating lever mounted inside the cockpit to operate the third traction cable.

15. The rotary wing aircraft according to claim 6, wherein the second traction cable is mounted in a slot obtained on the pulley and coupled to the second traction cable in a sliding manner so as to allow the rotation of the pulley to operate, at first, the first traction cable and the braking device and, subsequently, the second traction cable and the rocket.

16. The rotary wing aircraft according to claim 1, wherein the third operating device comprises a second traction cable connected to the rocket.

17. The rotary wing aircraft according to claim 1, wherein the nacelle has a pocket, which houses, on the inside, the rocket and the canopy and is closed by a door, which is expelled from the nacelle through the rocket.

* * * * *